United States Patent
Bolz et al.

(10) Patent No.: US 6,409,627 B2
(45) Date of Patent: *Jun. 25, 2002

(54) DEVICE AND METHOD FOR REDUCING SLIP IN THE CONTROL SYSTEM OF A CVT IN A MOTOR VEHICLE

(75) Inventors: Martin-Peter Bolz, Oberstenfeld; Holger Hülser, Stuttgart, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,132

(22) PCT Filed: Feb. 11, 1998

(86) PCT No.: PCT/DE98/00374

§ 371 (c)(1),
(2), (4) Date: Sep. 24, 1999

(87) PCT Pub. No.: WO98/43003

PCT Pub. Date: Oct. 1, 1998

(30) Foreign Application Priority Data

Mar. 25, 1997 (DE) .......................... 197 12 451

(51) Int. Cl.[7] .............................. B60K 41/12
(52) U.S. Cl. ...................................... 477/46
(58) Field of Search .................. 477/46, 45, 44

(56) References Cited

U.S. PATENT DOCUMENTS

| | | | | |
|---|---|---|---|---|
| 4,458,318 A | * | 7/1984 | Smit et al. ............... | 701/51 |
| 4,475,416 A | * | 10/1984 | Underwood .............. | 477/46 |
| 4,606,446 A | * | 8/1986 | Watanabe ................. | 477/39 |
| 4,624,349 A | * | 11/1986 | Watanabe ................. | 477/39 |
| 4,631,043 A | * | 12/1986 | Tokoro et al. ............ | 474/18 |
| 4,672,864 A | * | 6/1987 | Morimoto ................. | 477/39 |
| 4,771,658 A | * | 9/1988 | Miyawaki ................. | 477/49 |
| 4,977,798 A | * | 12/1990 | Takahashi ................. | 477/46 |
| 5,011,458 A | * | 4/1991 | Kumm .................... | 474/49 |
| 5,042,325 A | * | 8/1991 | Sawasaki et al. ......... | 477/45 |
| 5,098,345 A | | 3/1992 | Van Vuuren | |
| 5,211,083 A | * | 5/1993 | Hattori et al. ............ | 477/39 |
| 5,871,411 A | | 2/1999 | Senger et al. | |

FOREIGN PATENT DOCUMENTS

| | | |
|---|---|---|
| DE | 4021520 | 1/1991 |
| EP | 0446497 | 9/1991 |
| EP | 0530381 | 3/1993 |
| JP | 61-021461 | 6/1986 |
| JP | 62-167966 | 1/1988 |
| JP | 63-062954 | 8/1988 |
| JP | 63-067457 | 8/1988 |
| WO | WO 92 18791 | 10/1992 |

* cited by examiner

Primary Examiner—Charles A Marmor
Assistant Examiner—Ha Ho
(74) Attorney, Agent, or Firm—Walter Ottesen

(57) ABSTRACT

The invention proceeds from a control of a transmission which is adjustable continuously with respect to its transmission ratio, for a motor vehicle. The transmission together with a drive unit is mounted in the drive train of the motor vehicle and the drive unit has an adjustable drive torque. The transmission includes a drive end as well as an output end and operative means for establishing a mechanical operative connection between the drive end and the output end. Furthermore, detection means for detecting a slip quantity is provided. The slip quantity represents the slip between the operating means and the drive end and/or output end. Pregivable measures are initiated in response to a pregiven value of the slip quantity. The essence of the invention is that measures as follows are initiated: a drive of a clutch mounted in the drive train; and/or, a change of the transmission ratio; and/or, a change of the output torque of the drive unit. It is especially intended that measures are initiated in the sense of a slip reduction.

5 Claims, 1 Drawing Sheet

DEVICE AND METHOD FOR REDUCING SLIP IN THE CONTROL SYSTEM OF A CVT IN A MOTOR VEHICLE

FIELD OF THE INVENTION

The invention relates to an arrangement and a method for controlling a transmission in a motor vehicle. The transmission is continuously adjustable with respect, to its transmission ratio.

BACKGROUND OF THE INVENTION

In a motor vehicles having a known continuously variable transmission (CVT) with a continuous element (for example, a thrust element belt or chain), the contact engaging force of the conical pulleys against the thrust element belt must be so adjusted via suitable measures that the torque, which is to be transmitted, can be transmitted. A high slippage between the continuous element and the pulleys occurs when the contact engaging force is too low and this can lead to damage. If the contact engaging force is, however, greater than absolutely necessary to avoid slippage, then the efficiency of the transmission drops which leads to an unnecessarily high consumption of fuel. For this reason, it is advantageous to so select the contact engaging force that the maximum tranmissible torque for this contact engaging force is only slightly greater than the torque to be transmitted at the particular time. If a high slippage of the continuous element nonetheless occurs, then measures must be taken in order to stabilize or stop the relative movement of the continuous element so that damage is avoided.

SUMMARY OF THE INVENTION

Conventional continuously variable transmission controls, such as disclosed in EP,A1,0 451 887, determine the transmission input torque from the torque, which is outputted by the engine, and the converter amplification. A belt tension is computed from this torque from which belt tension a contact engaging force results which makes possible a reliable transmission of this torque. Here, as a rule, a considerable reserve of reliability is considered which causes a higher fuel consumption. If an impermissibly high slippage nonetheless occurs, then, in general, the contact engaging force and therefore the belt tension is increased. The speed with which a reaction can be had to excessive slippage is, however, limited by the time constants of the hydraulic and of the mechanical system of the belt tensioning adjustment.

A system is known from EP,B1,0 446 497 (corresponding to US 5,098,345) for protecting against exceeding a maximum slippage of the belt. Here, a clutch is so controlled that this clutch always starts slipping at lower drive torques than the band. A reaction to a possible slippage of the band is not described here.

The detection of belt slippage is known in many configurations. Thus, and for example in accordance with U.S. Pat. No. 5,871,411, it is suggested to detect the speed of the continuous element. Furthermore, the belt slippage can be detected by a sensor which simulatneously detects the axial displacement of a conical-pulley pair and the rpm of this pair. From earlier German patent application 196 38 277.7, it is known to provide at least two sensor units for slippage detection which are mounted in the region of the continuous means and between the drive end and the output end.

The object of the present invention is to provide effective measures for excessive slippage in order to reliably avoid damage to the transmission.

As mentioned, the invention proceeds from a control of a transmission, which is continuously adjustable with respect to its transmission ratio, for a motor vehicle. The transmission is mounted in the drive train of the motor vehicle together with a drive unit having an adjustable drive torque. The transmission has a drive end and an output end and operative means for establishing a mechanical operative connection between the drive end and the output end. Furthermore, detecting means for detecting a slippage quantity is provided which represents the slippage between the operative means and the drive end and/or output end. Pregivable measures are initiated in response to a pregivable value of the slip quantity. The essence of the invention is seen in that the following are provided as measures:

a control of a clutch mounted in the drive train; and/or, a change of the transmission ratio; and/or, a change of the output torque of the drive unit.

It is especially intended here that the measures are initiated in the sense of avoiding slip.

In an advantageous embodiment of the invention, a further measure is a change of the contact engaging force between the drive end and/or the output end and the operative means, especially in the sense of avoiding slip.

The present invention describes how through slipping of the continuous element can be stopped and stabilized to a tolerable slip with three or four possible interventions when through slip of the continuous element is detected. The invention offers the possibility to undertake the introduced measures individually or with a coordinated strategy. Depending upon the particular situation, which led to a through slip of the continuous element, a response is provided in accordance with a previously determined strategy having a selection of the measures according to the invention simultaneously or in a tight time-dependent sequence. This always takes place with the objective to suppress a detected slip as quickly as possible and not to confuse the driver with effects of the measures. Depending upon the equipped variation of the vehicle, it is possible that not all of these measures can be carried out.

It is especially provided that:

the drive of the clutch takes place in the sense of an opening of the clutch; and/or, the change of the transmission ratio takes place in response to a positive slip quantity in the sense of an increase of the transmission ratio and in response to a negative slip quantity in the sense of a reduction of the transmission ratio; and/or, the change of the output torque of the drive unit takes placein response to a positive slip quantity in the sense of a reduction of the output torque and in response to a negative slip quantity in the sense of an increase of the output torque.

Furthermore, it is especially advantageous that the following is dependent upon the extent of the detected slip quantity:

the extent of the drive of the clutch; and/or, the extent of the change of the transmission ratio; and/or, the extent of the change of the output torque of the drive unit; and/or, the extent of the change of the contact engaging force.

In a further advantageous embodiment of the invention it is provided that, simultaneously or in time after the drive of the clutch in the sense of an opening of the clutch, the following is provided: a change of the transmission ratio; and/or, a change of the instantaneous output torque of the drive unit; and/or, a change of the contact engaging force in such a manner that the maximum transmissible torque by the transmission becomes again greater in magnitude than the magnitude of the instantaneous output torque of the drive unit. In this way, the clutch slip can again be reduced by an increase of the maximum transmissible torque of the clutch (closing of the clutch).

It is especially provided that the change of the output torque of the drive unit for slip reduction is actuated as support to at least one of the other measures (clutch drive and/or change of the transmission ratio and/or contact engaging force).

As already described, the transmission can be a continuous transmission. The drive end and/or the output end can have at least an axially displaceable element which has essentially the form of a conical pulley. As operative means, at least a belt (preferably a thrust element belt) or a belt or a chain is tensioned between pulley pairs which define the drive end and the output end.

BRIEF DESCRIPTION OF THE DRAWING

FIG. 1 shows schematically a continuously variable transmission having a known control of the contact engaging force; whereas.

DESCRIPTION OF THE PREFERRED EMBODIMENTS OF THE INVENTION

Figure 1:
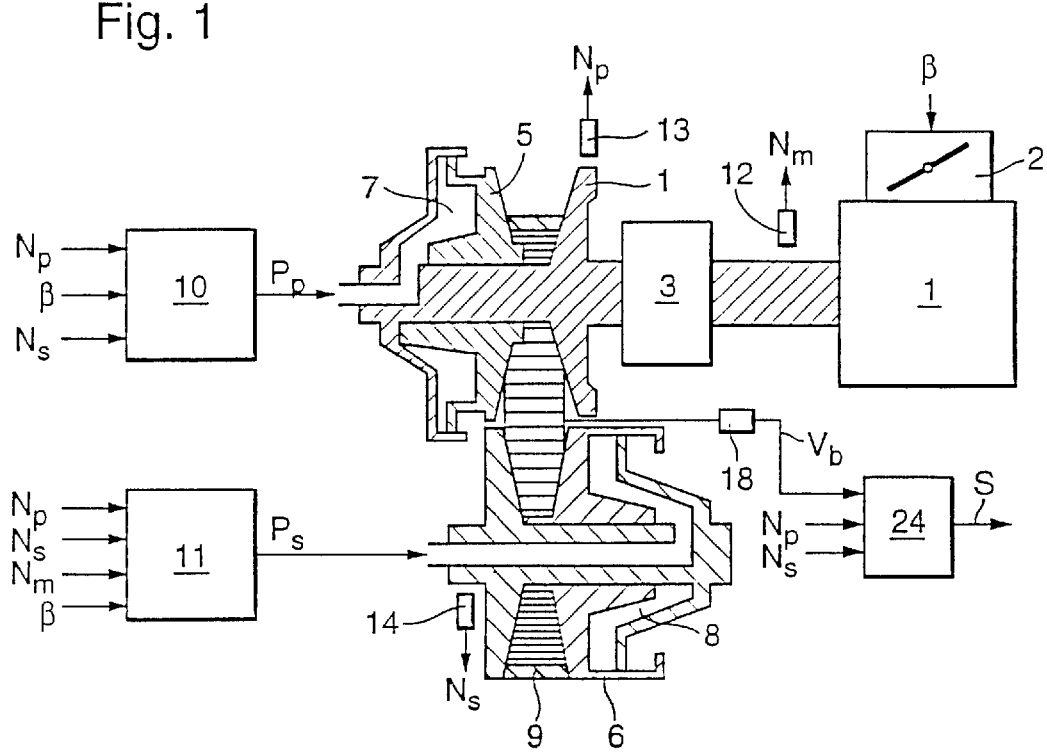

In FIG. 1, a known configuration of a continuously variable transmission is shown in section. The internal combustion engine 1 can be influenced by the throttle flap 2 with respect to its outputted torque $M_m$. The throttle flap 2 is, for example, coupled mechanically or electrically to the accelerator pedal (not shown). The engine 1 is coupled mostly by means of a clutch and/or a converter 3 to the drive end (primary end) of the CVT transmission 4. The output end (secondary end) of the CVT transmission 4 is connected via a downstream transmission (not shown) to the wheels of the vehicle. The CVT transmission has an axially displaceable conical pulley on each of the primary and secondary ends. To adjust the transmission ratio, a corresponding primary pressure $P_p$ or a secondary pressure $P_s$ is built up in the oil chambers 7 and 8, respectively.

With a suitable selection of the actuating quantities of primary pressure $P_p$ and secondary pressure $P_s$ the following must be ensured:

1. the transmission ratio i corresponds to the desired ratio of primary rpm $N_p$ and secondary rpm $N_s$; and,
2. the force transmitting thrust element belt 9 (for example, chain, belt) is pressed against the pulleys with sufficient force in order to prevent a through slippage of the thrust element 9.

The above-mentioned point 1 is realized via an electro-hydrayulic transmission ratio or primary rpm control 10. For point 2, a belt tension control 11 is used.

Rpm sensors 12, 13, and 14 are provided on the engine 1 and on the CVT transmission 4 for the transmission ratio and belt tension control. The rpm sensors 12, 13 and 14 detect the engine rpm $N_m$, the primary rpm $N_p$, and the secondary rpm $N_s$.

The master-slave principle is shown in FIG. 1 and is mostly utilized. In this master-slave principle, the secondary pressure $P_s$ serves to adjust the belt tension and the primary pressure $P_p$ serves to adjust the transmission ratio rpm or the primary rpm. For the alternative partner principle, the belt tension control influences the primary pressure as well as the secondary pressure.

Generally, one can state that a position signal in the form of a pressure quantity $P_s$ is available for the belt tension control. From the literature, several methods for controlling the belt tension are known, which however all work in a similar manner.

In FIG. 1, a sensor is identified by reference numeral 18 which detects the speed $V_b$ of the belt 9. In block 24, the actual belt slip S is determined from the belt speed $V_b$, the primary rpm $N_p$ and the secondary rpm $N_s$ as described in the initially-mentioned U.S. Pat. No. 5,871,411. It is here noted that the slip determination can also be obtained differently without departing from the concept of the invention.

Figure 2:
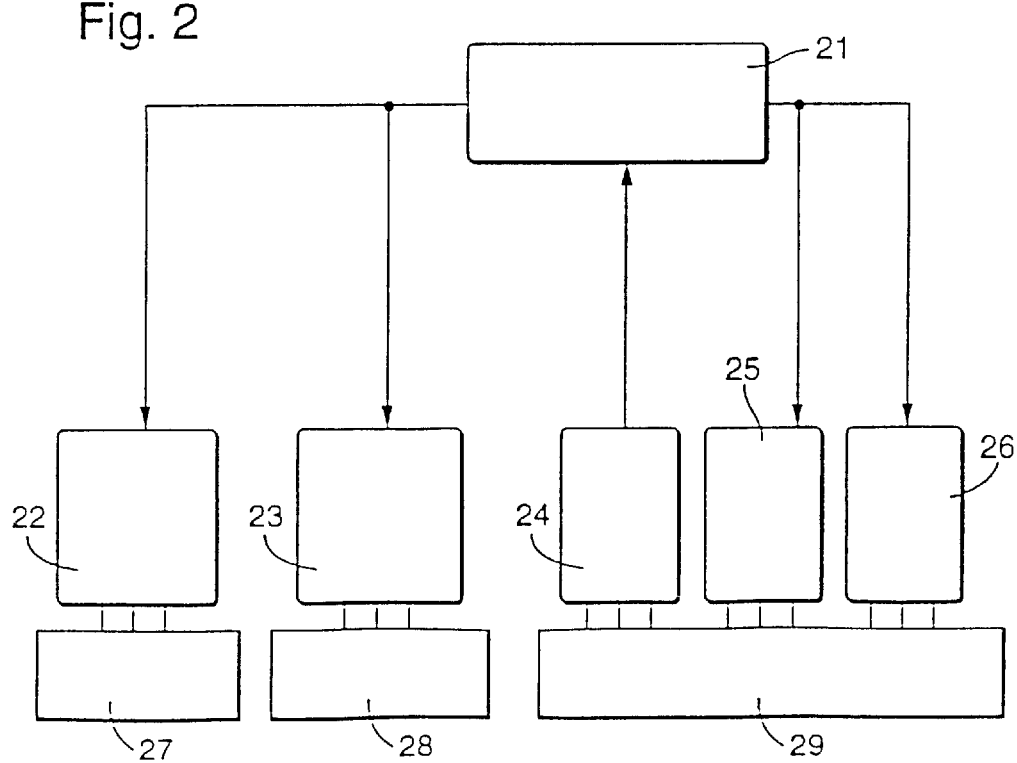
FIG. 2 shows an embodiment with reference to a block circuit diagram.

In FIG. 2, the four possible interventions for slip reduction are shown. With reference numerals 27, 28 and 29, the drive motor 27 with the corresponding engine control 22, the clutch 28 with the corresponding clutch control 23 as well as the CVT transmission 29 with the already-described slip detection 24, the belt tensioning control 25 and the transmission ratio control 26 are shown.

The individual actions for reducing the through slip of the continuous element are matched by the block 21 "slip intervention" in response to a detected excessive slip S of the continuous element in order to stop the slip or to stabilize the slip to an acceptable slip. In dependence upon the particular situation which led to a through slip of the continuous element 9, a response is provided in accordance with a previously determined strategy with a selection of measures (here described) simultaneously or in a tight time sequence. These measures are undertaken with the object of suppressing a detected slip as quickly as possible and not to confuse the driver by the effects of the measures.

Not all of these measures can be carried out depending upon the equipment vairation of the vehicle.

Increase of the Belt Tension (Block 25)

If the slip detection 21 detects an increased slip S, then the tension of the continuous element 9 is increased in order to reduce the slip S to a tolerable amount via an increased contact engaging force. The increase $\Delta F$ takes place independently of the sign of the detected slip S.

It is especially advantageous to select the quantity $\Delta F$ of the additional tension of the continuous element 9 in dependence upon the amount of the detected slip S. Here, it must be considered that the contact engaging force must be greatly increased because of the transition from static friction to sliding friction between the continuous element and the pulley in order to reduce slip. It is therefore advantageous when the additional belt tension $\Delta F$ is not linearly dependent upon the detected slip S. As already mentioned, the speed with which a response can be made is limited by the time constants of the hydraulic system and of the mechanical system.

Transmission Ratio Adjustment (Block 26)

If the slip detection 24 detects an increased slip S, then the transmission ratio i of the continuous transmission is so adjusted that the geometric transmission ratio corresponds again to the rpm transmission ratio.

For a known positive slip, this means that the slip intervention requires a positive additional transmission ratio $\Delta i$, that is, a larger transmission ratio is required than without intervention. On the other hand, for a detected negative slip S, a negative additional transmission ratio $\Delta i$ is required which reduces the transmission ratio i of the transmission.

It is especially advantageous to select the magnitude of the additional transmission ratio $\Delta i$ in dependence upon the detected slip S.

This intervention for positive slip is especially suitable for the present-day conventional constructions of the CVTs. For positive slip, for which the engine torque $M_m$ can no longer be transmitted, the engine rpm increases greatly. The additional transmission ratio $\Delta i$ can be realized by releasing oil from the primary pulley without an additional pumping capacity for hydraulically increasing the contact engaging force. This measure should, however, be combined with a reducing engine torque intervention (block 22) which is yet to be described.

Torque Intervention at the Engine (Block 22, 27)

If the slip detection 21 detects an increased slip S, then the torque $M_m$, which is outputted by the engine 27, can be changed in order to adapt the torque, which is to be transmitted by the transmission, to the maximum transmissible torque $M_{max}$ and to thereby reduce the slip to a tolerable amount.

For positive slip (that is, when the transmission input rpm $N_p$ is greater than it should be in accordance with the geometric transmission ratio), the torque $M_m$, which is outputted by the engine 27, must be reduced (the additional torque $\Delta M_m$ is negative). For this purpose, all interventions can be used which are applicable to a known output slip control (ASR). These interventions include, for example, an ignition angle intervention for a spark-ignition engine not having electronic engine power control (E-gas). For engines having electronic engine power control (E-gas or EDC), simply a reduced torque is required. In each case, the slip intervention requires a negative additional torque $\Delta M_m$.

If the drag torque of the engine 27 with respect to magnitude is greater than the torque $M_{max}$, which is maximally transmissible by the transmission, then the transmission input rpm $N_p$ is less than it should be in accordance with the geometric transmission ratio. In this case, a negative belt slippage is present and the drag torque of the engine 27 should be reduced. All interventions can serve for this purpose which are used at the present time for a known engine drag torque control (MSR). For engines having electronic engine power control (E-gas or EDC), simply a higher torque is required. This means that the slip intervention requires a positive additional torque $\Delta M_m$ for a negative slip.

It is especially advantageous in both cases to select the magnitude of the additional torque $\Delta M_m$ at the engine 27 in dependence upon the amount S of the detected slip. These interventions are characterized by their relatively short time constants and should therefore always be applied supportive to the other interventions presented herein.

Clutch Intervention (Block 23, 28)

If the vehicle has, for example, an electronically influenceable clutch 28, then, when slip S of the continuous element 9 in the transmission is detected, the maximum transmissible torque $M_{K,max}$ of the clutch 28 can also be reduced so that the slip occurs at the clutch 28 in lieu of at the continuous element 9. This is advantageous because the clutch 28 is so configured in its construction that is can withstand a higher slip for a certain time without damage.

If the maximum transmissible torque $M_{K,max}$ is reduced at the clutch 28 by a clutch intervention $\Delta M_K$, then the torque at the transmission input cannot be greater in magnitude than the maximum transmissible torque $M_{K,max}$ of the clutch. In this way, it is possible to make the torque of the transmission 29, which is to be transmitted, less in magnitude than the maximum transmissible torque $M_{get,max}$ of the transmission 29 and to so limit the slip at the transmission to a noncritical value.

As long as the torque $M_m$ at the engine output, the contact engaging of the continuous element 9 and the transmission ratio i of the transmission do not change, the slip then occurs at the clutch 28 instead of at the transmission 29. This is advantageous for the above-mentioned reasons.

It is especially advantageous to ensure, via one of the other three described measures, that the torque $M_{get,max}$ which is the maximum torque transmissible by the transmission 29, becomes greater again in magnitude than the magnitude of the engine output torque in order to be able to reduce the slip at the clutch 28 via an increase (closure of the clutch) of the maximum transmissible torque $M_{K,max}$ of the clutch.

In summary, it can be stated that the described possibilities can be applied individually or in combination. Especially, in dependence upon the situation, combined interventions should always be carried out so that the driver does not notice the interventions on the slip control. Within a few milliseconds (50 to 590 ms), the condition wanted by the driver should again be applicable in the drive train of the vehicle so that the vehicle does not unexpectedly accelerate or decelerate.

What is claimed is:

1. An arrangement for controlling a transmission for a motor vehicle having a drive unit and a drive train, the motor vehicle including a clutch disposed between the drive unit and the transmission, the transmission having a transmission ratio which is continuously variable, the transmission and the drive unit being mounted in the drive train, the drive unit having an adjustable output torque ($M_m$), the transmission having a drive end and an output end and the transmission including operative means for providing a mechanical operative connection between the drive end and the output end thereof, the arrangement comprising:

detection means for detecting a slip (S) representing the slip between said operative means and at least one of said drive end and said output end of said transmission;

means for initiating a change ($\Delta i$) of the transmission ratio (i) as a first measure in response to a pregiven value of said slip (S);

means for initiating at least one of the following measures in response to said pregiven value of said slip (S):

a change ($\Delta F$) of said contact engaging force between said drive end and/or said output end and said operative means in a direction to reduce said slip (S);

a drive ($\Delta M_K$) of said clutch arranged in said drive train; and, means for initiating a change ($\Delta M_m$) of said output torque of said drive unit as an additional measure in response to said pregiven value of said slip (S).

2. An arrangement for controlling a transmission for a motor vehicle having a drive unit and a drive train, the motor vehicle including a clutch disposed between the drive unit and the transmission, the transmission having a transmission ratio which is continuously variable, the transmission and the drive unit being mounted in the drive train, the drive unit having an adjustable outgut torque ($M_m$), the transmission having a drive end and an output end and the transmission including operative means for providing a mechanical operative connection between the drive end and the output end thereof, the arrangement comprising:

detection means for detecting a slip (S) representing the slip between said operative means and at least one of said drive end and said output end of said transmission;

means for initiating a chance ($\Delta i$) of the transmission ratio (i) as a first measure in response to a pregiven value of said slit (S);

means for initiating at least one of the following measures in response to said pregiven value of said slip (S):

a change ($\Delta F$) of said contact engaging force between said drive end and/or said output end and said operative means in a direction to reduce said slip (S);

a drive ($\Delta M_K$) of said clutch arranged in said drive train;

means for initiating at least one of the following measures in response to said pregiven value of said slip (S):

causing the drive ($\Delta M_K$) of said clutch to take place in the sense of an opening of the clutch;

causing the change ($\Delta i$) of the transmission ratio (i) to take place in response to a positive slip quantity in the sense of an increase in the transmission ratio (i) and in response to a negative slip quantity in the sense of a reduction of the transmission ratio; and, causing the change ($\Delta M_m$) of the output torque of the drive unit to take place in. response to a positive slip quantity in the sense of a reduction of the output torque in response to a negative slip quantity in the sense of an increase of the output torque.

3. An arrangement for controlling a transmission for a motor vehicle having a drive unit and a drive train, the motor vehicle including a clutch disposed between the drive unit and the transmission, the transmission having a transmission ratio which is continuously variable, the transmission and the drive unit being mounted in the drive train, the drive unit having an adjustable output torque ($M_m$), the transmission having a drive end and an output end and the transmission including operative means for providing a mechanical operative connection between the drive end and the output end thereof, the arrangement comprising:

detection means for detecting a slip (S) representing the slip between said operative means and at least one of said drive end and said output end of said transmission;

means for initiating a change ($\Delta i$) of the transmission ratio (i) as a first measure in response to a pregiven value of said slip (S);

means for initiating at least one of the following measures in response to said pregiven value of said slip (S):

a change ($\Delta F$) of said contact engaging force between said drive end and/or said output end and said operative means in a direction to reduce said slip (S);

a drive ($\Delta M_K$) of said clutch arranged in said drive train; and, the transmission has a maximum transmissible torque ($M_{get,max}$) and, simultaneously or in time after the drive ($\Delta_{K,max}$) of the clutch in the sense of an opening of the clutch, a change ($\Delta i$) of the transmission ratio and/or a change ($\Delta M_m$) of the instantaneous output torque of the drive unit and/or, a change of the contact engaging force ($\Delta F$) is made in such manner that the torque ($M_{get,max}$) which is transmitted maximally by the transmission, becomes greater than the magnitude ($M_m$) of the instantaneous output torque of the drive unit.

4. An arrangement for controlling a transmission for a motor vehicle having a drive unit and a drive train, the motor vehicle including a clutch disposed between the drive unit and the transmission, the transmission having a transmission ratio which is continuously variable, the transmission and the drive unit being mounted in the drive train, the drive unit having an adjustable output torque ($M_m$), the transmission having a drive end and an output end and the transmission including operative means for providing a mechanical operative connection between the drive end and the output end thereof the arrangement comprising:

detection means for detecting a slip (S) representing the slip between said operative means and at least one of said drive end and said output end of said transmission;

means for initiating a change ($\Delta i$) of the transmission ratio (i) as a first measure in response to a pregiven value of said slip (S);

means for initiating at least one of the following measures in response to said pregiven value of said slip (S):

a change ($\Delta F$) of said contact engaging force between said drive end and/or said output end and said operative means in a direction to reduce said slip (S);

a drive ($\Delta M_K$) of said clutch arranged in said drive train;

wherein the transmission has a maximum transmissible torque ($M_{get,max}$); and, the clutch responds in the sense of a closure in response to the torque ($M_{get,max}$), which is the maximum torque transmissible by the transmission and which becomes greater in magnitude than the torque ($M_m$) of the instantaneous output torque of the drive unit.

5. A method of controlling a transmission for a motor vehicle having a drive unit and a drive train, the motor vehicle including a clutch disposed between the drive unit and the transmission, the transmission having a transmission ratio which is continuously variable, the transmission and the drive unit being mounted in the drive train, the drive unit having an adjustable output torque ($M_m$), the transmission having a drive end and an output end and the transmission including operative means for providing a mechanical operative connection between the drive end and the output end thereof, the method comprising the steps of:

detecting a slip quantity (S) which represents the slip between the operative means and at least one of the drive end and the output end of said transmission;

initiating a chance ($\Delta i$) of the transmission ratio (i) as a first measure in response to a pregiven value of said slip (S); and, initiating at least one of the following measures in response to said pregiven value of said slip (S):

a chance (6F) of said contact engaging force between said drive end and/or said outgut end and said operative means in a direction to reduce said slip (S); and, a drive ($\Delta M_K$) of said clutch arranged in said drive train;

wherein said measures include at least one of the following:

causing the drive ($\Delta M_m$) of the clutch to take place in the sense of an opening of the clutch;

causing the change ($\Delta i$) of the transmission ratio (i) in response to a positive slip quantity to take place in the sense of an increase of the transmission ratio and, in response to a negative slip quantity, take place in the sense of a reduction of the transmission ratio; and/or, causing the change of the output torque ($\Delta M_m$) of the drive unit to take place in response to a positive slip quantity in the sense of a reduction of the output torque, in response to a negative slip quantity in the sense of an increase of the output torque; and, wherein:

the extent of the drive of the clutch; and/or, the extent of the change of the transmission ratio; and/or, the extent of the change of the output torque of the drive unit is dependent upon the extent of the detected slip quantity and, as a further measure, a change of the contact engaging force is provided between the drive and/or output end and the operative means, especially in the sense of a slip reduction.

* * * * *

UNITED STATES PATENT AND TRADEMARK OFFICE
CERTIFICATE OF CORRECTION

PATENT NO. : 6,409,627 B2
DATED : June 25, 2002
INVENTOR(S) : Martin-Peter Bolz and Holger Huelser It is certified that error appears in the above-identified patent and that said Letters Patent is hereby corrected as shown below:

<u>Column 6,</u>
Line 40, delete "outgut" and substitute -- output -- therefor.
Line 48, delete "chance" and substitute -- change -- therefor.
Line 50, delete "slit" and substitute -- slip -- therefor.

<u>Column 7,</u>
Line 2, delete "in." and substitute -- in -- therefor.
Line 51, delete "thereof" and substitute -- thereof, -- therefor.

<u>Column 8,</u>
Lines 24 and 29, delete "chance" and substitute -- change -- therefor.
Line 29, delete "(6F)" and substitute -- ($\Delta$F) -- therefor.
Line 30, delete "outgut" and substitute -- output -- therefor.

Signed and Sealed this

Seventeenth Day of June, 2003

JAMES E. ROGAN
*Director of the United States Patent and Trademark Office*